J. C. KEAVEY.
ANTISKID DEVICE.
APPLICATION FILED JUNE 12, 1919.
1,388,264.
Patented Aug. 23, 1921.
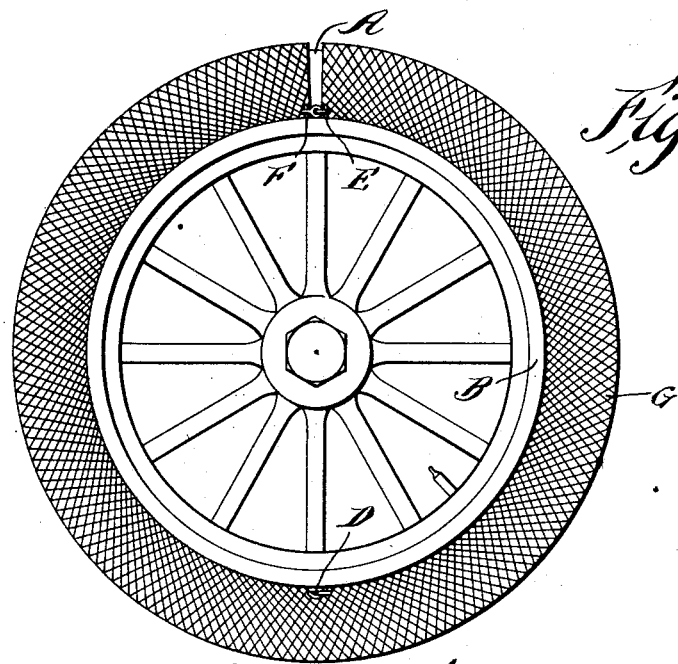
Fig. 1
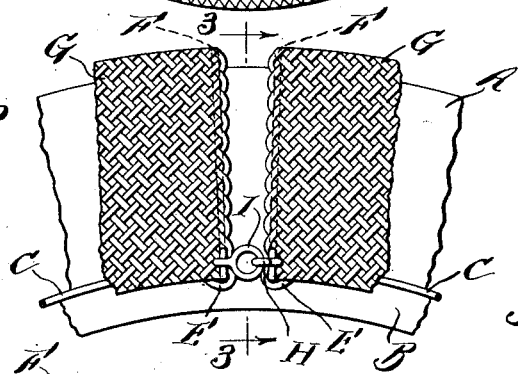
Fig. 2
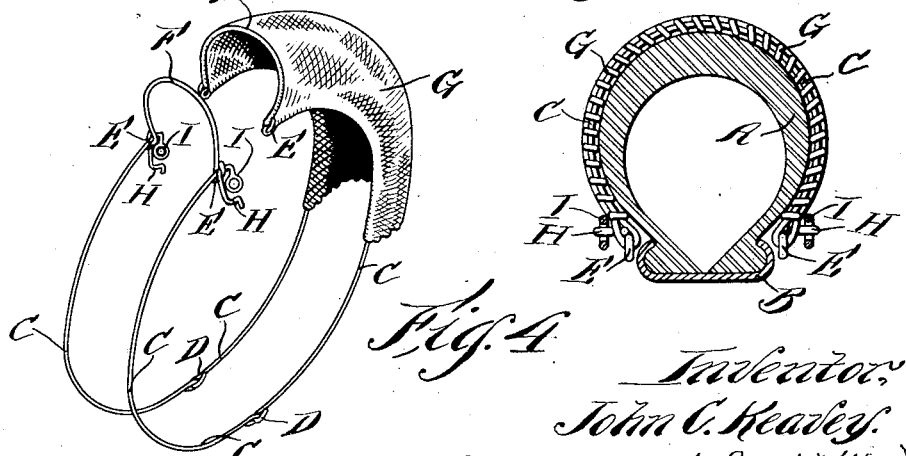
Fig. 3
Fig. 4
Inventor,
John C. Keavey.

UNITED STATES PATENT OFFICE.

JOHN C. KEAVEY, OF CLEVELAND, OHIO.

ANTISKID DEVICE.

1,388,264.                    Specification of Letters Patent.        Patented Aug. 23, 1921.

Application filed June 12, 1919.   Serial No. 303,670.

*To all whom it may concern:*

Be it known that I, JOHN C. KEAVEY, a citizen of the United States, residing at Cleveland, in the county of Cuyahoga and State of Ohio, have invented a certain new and useful Improvement in Antiskid Devices, of which the following is a full, clear, and exact description, reference being had to the accompanying drawings.

This invention relates generally to automobile tires and more particularly to an anti-skin device adapted to be applied thereto to prevent skidding. The object of the invention is to provide an exceedingly simple and highly efficient device which can be quickly and easily applied and also quickly and easily removed and folded into a compact space.

With these various objects in view the invention consists in the novel features of construction hereinafter fully described and set forth in the appended claim.

In the drawings forming a part of this specification Figure 1 is a side view of a tire having my improved anti-skid device applied thereto; Fig. 2 is an enlarged view showing the manner of connecting the opposing ends of the device; Fig. 3 is a detail sectional view on the line 3—3 of Fig. 2; and Fig. 4 is a perspective view of the frame showing a portion of the woven wire fabric applied thereto.

In the drawings, A indicates a tire applied to a rim B as usual. In constructing the anti-skid device in accordance with my invention I employ two side rings each composed of two semi-circular sections C united at D in the form of an ordinary loop or eye, and at each end the section C terminates in an eye E. Connected to these eyes E are the semi-circular bands F. A woven wire fabric G which may be made in any suitable manner is connected to the semi-circular bands F and also to the ring members C as shown, thereby providing a cover of such size and shape as to fit over the tire shoe of that particular size. In order to unite the ends, after the cover has been applied to the tire, I employ hooks H having eyes I through which the extreme end of the hook is adapted to pass after being passed through the eyes E at each end of the ring section C and if desired, an additional hook can be employed in connection with the central portions of the semi-circular bands F. Once the device is applied however, the internal tire pressure will tend to hold the device as a whole from dislocation.

An anti-skid device constructed as herein shown and described can be quickly and easily applied to a tire, and just as quickly and easily removed therefrom, and when not in use can be folded into a comparatively compact space due to the fact that the ring sections are hinged at the point D.

Having thus described my invention, what I claim is:—

A device of the kind described comprising the semicircular side rings hinged together and terminating in eyes at the free ends, arched transverse bands connected to said eyes, a fabric connected to the transverse bands and to the side rings, and hooks passing through the eyes at the ends of the side rings, each hook having an eye to receive the extreme end of the hook as set forth.

In testimony whereof I hereunto affix my signature.

JOHN C. KEAVEY.